Aug. 25, 1931.                G. B. PICKOP                1,820,676
                      APPARATUS FOR VIBRATING OBJECTS
                            Filed Feb. 7, 1930

Inventor
George B. Pickop
By Rockwell & Bartholow
                    Attorneys

Patented Aug. 25, 1931

1,820,676

UNITED STATES PATENT OFFICE

GEORGE B. PICKOP, OF NEW HAVEN, CONNECTICUT, ASSIGNOR TO MALLEABLE IRON FITTINGS COMPANY, OF BRANFORD, CONNECTICUT

APPARATUS FOR VIBRATING OBJECTS

Application filed February 7, 1930. Serial No. 426,743.

This invention relates to the method of and means for vibrating objects, and more particularly to the vibration of objects which are being transported or carried from one place to another, in which case it is advantageous to subject the objects to the action of the vibrating means without substantially interfering with or interrupting their travel. In many instances, it is desirable, for instance, to clean castings during their travel from one point to another. In some instances such articles as castings are transported from one place to another in a factory in order that various operations may be performed on the castings, and it is more or less usual practice for containers to be carried to a position in which they are filled with material and then transported to some other location to be closed or shipped. In such cases, as well as in a number of other instances which it is not necessary to mention, it is advantageous to subject the objects or the containers during their travel to the action of a vibrator apparatus, in order to clean the castings or to consolidate the contents of the containers or receptacles. As the transporting or conveying means is usually continuously in motion, it is, of course, desirable that the action of the vibrating means take place without interrupting this movement.

One object of my invention is the provision of a method of subjecting various objects to the action of a vibrating mechanism, while these objects are being transported from place to place without interrupting the movement of the transporting means.

Another object of the invention is the provision of a vibrating apparatus adapted to vibrate or agitate objects during their transportation from one place to another such that the action of the vibrating apparatus will not interfere with the movement of the transporting means.

A still further object of the invention is the provision of a vibrating apparatus by which objects may be vibrated for cleaning or for consolidating the contents thereof during the transportation of such objects from one place to another.

A still further object of the invention is the provision of a vibrating apparatus by which objects may be brought into operative contact with a vibrated member during their transportation, without interfering with the movement of the transporting means.

To these and other ends the invention consists in the novel features, steps and combinations of parts to be hereinafter described and claimed.

Figure 1:
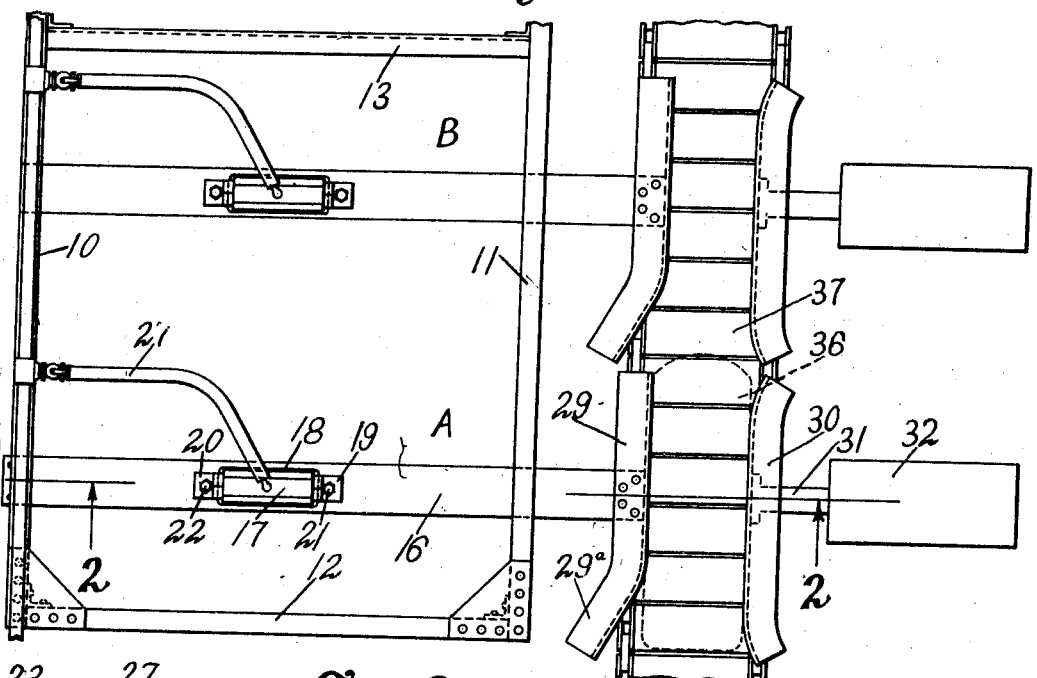
Fig. 1 is a top plan view of a vibrating apparatus embodying my invention.
Figure 2:
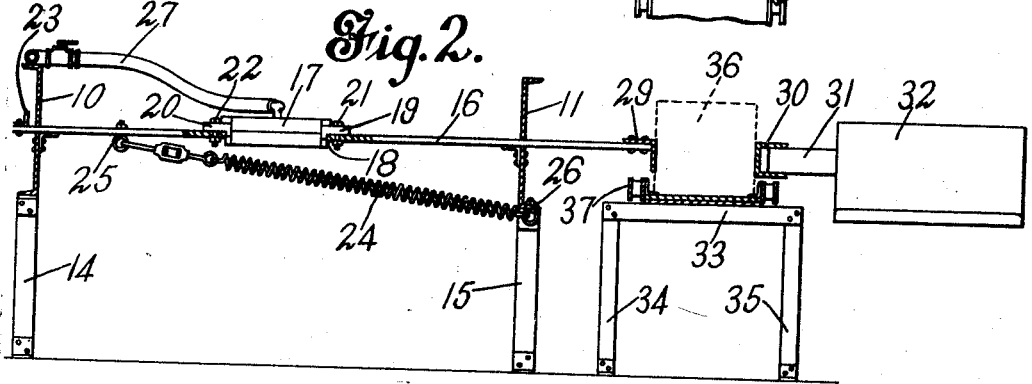
Fig. 2 is a sectional view on line 2—2 of Fig. 1.

In the preferred embodiment of my invention shown in Figs. 1 and 2 of the drawings, I have illustrated a supporting frame comprising channel side members 10 and 11 connected by transverse frame members 12 and 13. The frame thus formed may be supported in any desired manner such as by the standards or legs 14 and 15.

In Fig. 1 of the drawings I have shown two vibrating stations or two sets of apparatus A and B, but it will be understood that as many stations or sets may be used as is desired, for instance, in some cases it may only be necessary to have one, while in others, three or more may be required. As these sets or stations are duplicates of each other, one only will be described.

In openings in the side frames 10 and 11, a vibrator supporting bar 16 is slidably arranged. This supporting member 16 carries the vibrator 17 which, as shown in the drawings, may be the usual type of vibrator operated by compressed air. The member 16 may be provided with an opening 18 within which the body of the vibrator is received, the vibrator body having end lugs 19 and 20, which are bolted flatwise to the supporting member by the bolts 21 and 22.

As stated above, the member 16 is slidably mounted in the frame members 10 and 11 and on one end of this member, the left hand end as shown in Fig. 2, is provided a stop 23 designed to contact with the frame member 10 and limit the movement of this member toward the right, under the influence of the spring 24 which is secured to the vibrator supporting member at 25 and to the frame at 26. The spring is so tensioned as to constantly urge the supporting member 16 toward the right as shown in Fig. 2, so as to hold the right hand end of this member in contact with the work. Compressed air may be delivered to the vibrator through the hose 27.

Upon the right hand end of the supporting member 16 is provided a contact member or shoe 29 designed to be brought into contact with the object to be vibrated, and to transmit the vibrations thereto. Opposite the contact shoe 29 is mounted an abutment member 30 designed to contact with the object to be vibrated on the side thereof opposite the contact shoe, so that the object will be held in firm contact with the shoe. The abutment member 30 may be supported in any desired manner such as by a plunger 31 mounted in the housing 32.

Below the members 29 and 30 is a support or table 33, supported in turn by legs 34 and 35, upon which the work or object may rest while being subjected to the action of the vibrating apparatus. As shown in Fig. 2, the object 36 may be carried or transported by a conveyor structure 37, so that the object will be carried upon the table 33, where it will be subjected to vibration.

Figure 3:
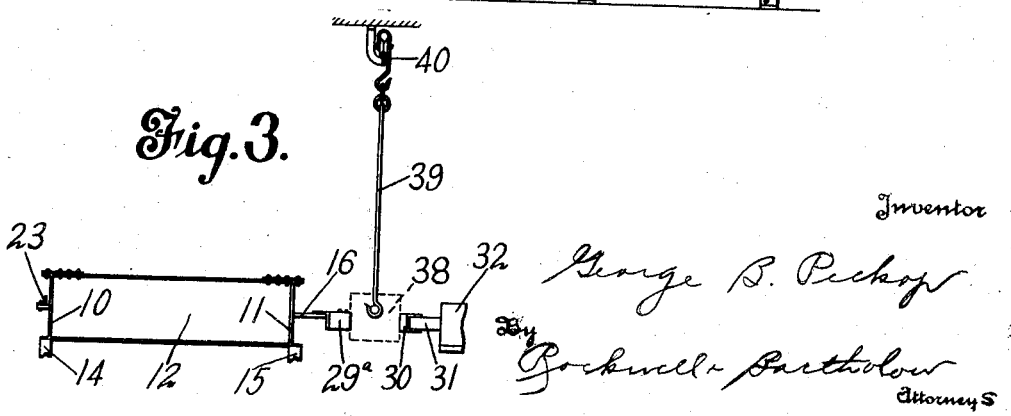
Fig. 3 is a diagrammatic elevational view of a modified form of the apparatus.

As shown in Fig. 3 of the drawings, the work 38 is suspended from above by a cable 39, the cable being in turn secured to an overhead carrier 40. In this instance where the article is suspended from above, it will not always be found necessary to provide support from beneath, as the work 38 will be supported by the overhead carrier and will be brought thereby into proper operative contact with the vibrating apparatus.

It will be noted that the contact shoe 29 has one end 29ª turned at a slight angle to the body portion thereof, so that, as shown in Fig. 1, the object may be carried between this shoe and the abutment 30 without being hindered by striking against the end edge of the shoe. The object, when being transported into position to be acted upon by the vibrating mechanism, will enter the flaring space formed by the portion 29ª of the contact member, and this member will be cammed by the contact of the object with the portion 29ª to the left against the tension of the spring 24. It will be noted that, as shown in Fig. 2 of the drawings, the stop member 23 is spaced to some extent from the frame member 10, thus showing that the contact shoe 29 is held firmly against the object 36 by the spring 24. This will provide for a firm contact between the shoe and the object, so that the vibrations will be effectively transmitted.

When the object passes on out of contact with the shoe 29, the supporting member 16 will be returned to its initial position by the spring, with the stop 23 against the member 10, and will be ready to receive a second object.

It will be apparent that while due to slack in the transporting mechanism, or lost motion therein, the work may be halted momentarily by being frictionally held between the shoe 29 and the abutment 30, this stoppage will be only momentary and in any event the continued movement of the conveying or transporting means is not interrupted or interfered with and the transportation of the work from one place to another by the conveying means will be carried on without interruption, the work being subjected to the action of the vibrating apparatus during its travel.

While I have shown and described some preferred embodiments of my invention, and a preferred method of practicing the same, it will be understood that the invention is not to be limited to all the details shown, but is capable of modification and variation within the spirit of the invention and within the scope of the appended claims.

What I claim is:

1. In combination, a work contact member, a vibrator attached to said member, means for supporting and transporting the work to be vibrated, and means for effecting contact of said contact member with the work, while the latter is carried by said transporting means, said supporting and transporting means being movable relatively to the contact member to carry the work to and past the latter.

2. In combination, means for supporting and transporting an object, a vibrating apparatus operatively supported adjacent said means and having a contact member to contact with the object, while the latter is supported and moved by said transporting means, said vibrating apparatus acting against the work independently of the supporting means.

3. In combination, continuously moving transporting means for an object to be vibrated, a vibrating apparatus having a yielding contact member positioned to contact with the object while carried by said transporting means, and an abutment member between which and the contact member the object is gripped.

4. In combination, a contact member, means to set said member into vibration, transporting means to transport an object to a position adjacent the contact member, and yielding means to effect a firm contact between the contact member and the object.

5. In combination, a contact member, means to set said member into vibration, transporting means to transport an object to a position adjacent the contact member, and means constantly urging the object and the contact member in firm contact with each other during the passage of the object by said contact member.

6. Vibrating mechanism comprising a contact member and means to set said member into vibration, transporting means for an object to be vibrated, and means for effecting firm contact between the contact member and the object without interrupting the movement of the transporting means.

7. Vibrating mechanism comprising an elongated contact member designed to contact with the object to be vibrated and means for setting said member into vibration, a second elongated contact member designed to bear against the object to be vibrated, one of said contact members being movable relatively to the other to hold the object firmly therebetween, and means for moving the work through the space between said contact members.

8. In a vibrator mechanism, a pair of members between which the work is adapted to be held, means for vibrating one of said members, and one of said members being movable relatively to the other to grip the work therebetween, and means to urge said movable member toward the work.

9. In a vibrator mechanism, a pair of members between which the work is adapted to be held, means for vibrating one of said members, and one of said members being movable relatively to the other to grip the work therebetween, and resilient means to urge said movable member toward the other member.

10. In a vibrating apparatus, a pair of contact members between which the object is adapted to be held, means for vibrating one of said members, means to urge one of said members toward the object, and means for transporting an object through the space between said members whereby it will be gripped therebetween and vibrated during its passage.

11. In a vibrating apparatus, a pair of contact members, means for vibrating one of said members, means for transporting an object to be vibrated between said members, one of said members being movably mounted and urged toward the object, whereby it will be gripped between the contact members, and said members being separable by engagement with the object in its passage therebetween.

12. In a vibrating apparatus, a pair of contact members, means for setting one of said members into vibration, means for transporting an object through the space between said members, one of said members being yieldable to permit said passage, and being urged into firm contact with the object without interrupting the movement of the transporting members.

13. In a vibrating apparatus, means to transport an object to be vibrated, a contact shoe mounted upon one side of the path of said object, means for vibrating said shoe, an abutment member on the other side of the path of the object, said contact shoe and abutment member being movable relatively toward and away from each other, and means for constantly urging said members toward each other to grip the object during its passage therebetween, whereby the object will be vibrated without interrupting the action of the transporting means.

14. In a vibrating apparatus, a frame, a vibrator supporting means slidably mounted in said frame, a vibrator carried by said supporting means, a contact shoe on said supporting means, means urging said shoe to a predetermined position relatively to said frame, an abutment means opposite said shoe, and means for transporting an object between said shoe and said abutment means.

15. Vibrating mechanism comprising a contact member designed to contact with the object to be vibrated, and a second contact member designed to bear against the object to be vibrated, one of said contact members being movable relatively to the other, means for setting one of said members into vibration, and means to transport an object to a position between said contact members and to carry said object away from such position.

16. Vibrating apparatus comprising a pair of contact members between which the object is adapted to be held, said contact members being relatively movable so as to grip the work therebetween, means to set at least one of said members into vibration, and means to transport an object between said contact members to be gripped and vibrated thereby.

17. Vibrating apparatus comprising a pair of horizontally spaced contact members, a vibrator secured to one of said members, the space between said members being open at its ends to permit the passage of an object to be vibrated therebetween, means for transporting an object between said members, and one of said members being movable relatively to the other.

18. Vibrating apparatus comprising a pair of horizontally spaced contact members, a vibrator secured to one of said members, the space between said members being open at its ends to permit the passage of an object to be vibrated therebetween, means for transporting an object between said members, one of said members being movable relatively to the other, and means for urging said movable member toward the cooperating member to grip the object therebetween.

In witness whereof, I have hereunto set my hand this 5th day of February, 1930.

GEORGE B. PICKOP.